Patented Aug. 4, 1931

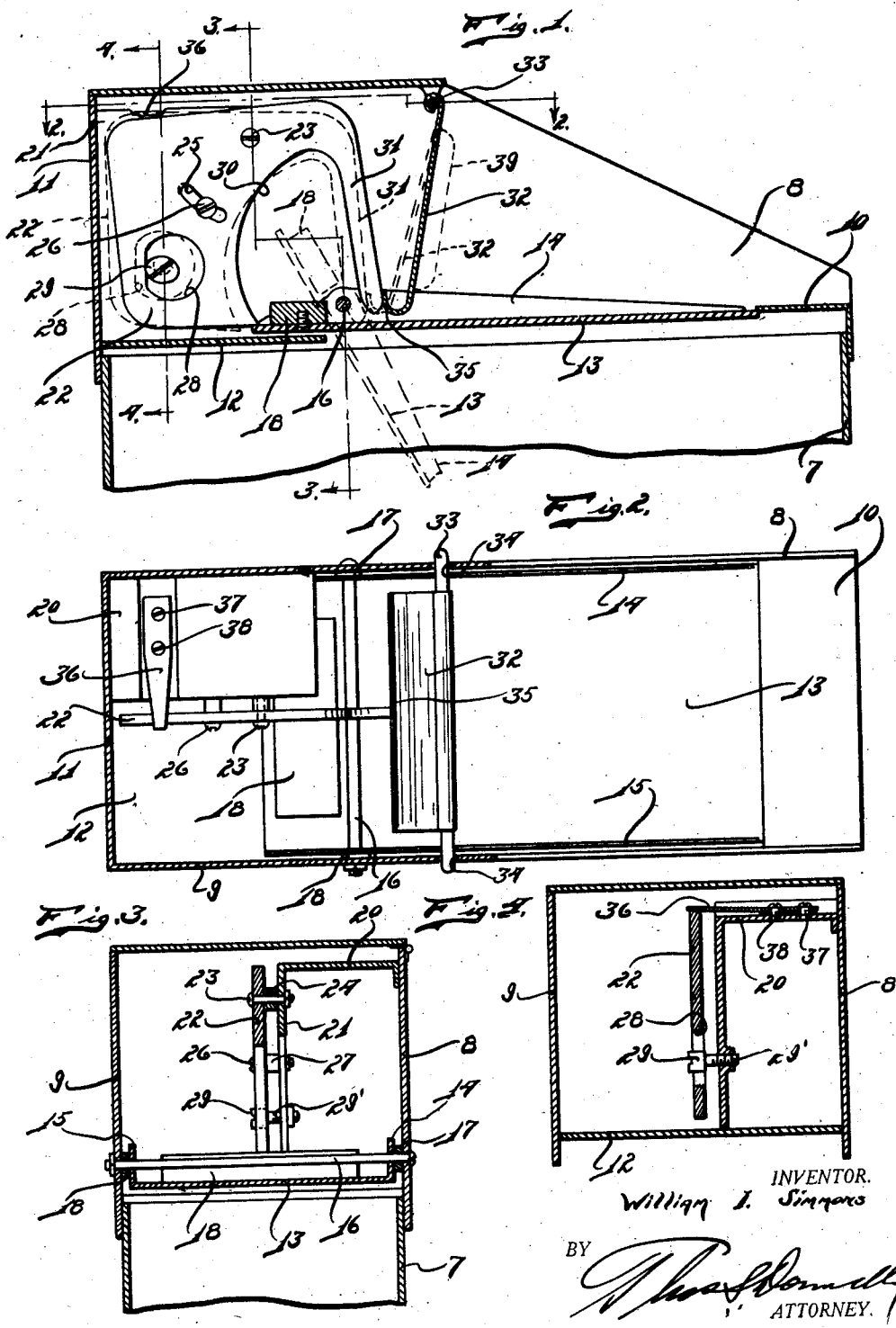

1,817,589

UNITED STATES PATENT OFFICE

WILLIAM I. SIMMONS, OF NOVI, MICHIGAN

TRAP

Application filed August 2, 1929. Serial No. 382,951.

My invention relates to a new and useful improvement in a trap adapted particularly for catching rats, mice and similar sized predatory animals.

It is an object of the present invention to provide a trap of this class which will be simple in structure, economical of manufacture and highly efficient in use.

Another object of the invention is the provision of a trap which may be adjusted to various degrees of sensitiveness so that it may trip with accuracy and speed.

Another object of the invention is the provision of a trap of this mechanism which may not be tripped by the animal to be trapped until the animal is in the proper position for trapping.

Another object of the invention is the provision in a trap of this nature of a releasing mechanism which may be adjusted to various degrees of tension.

Other objects will appear hereinafter.

The invention consists in the combination and arrangement of parts hereinafter described and claimed.

The invention will be best understood by a reference to the accompanying drawings which form a part of this specification and in which, Fig. 1 is a longitudinal central vertical sectional view of the invention.

Fig. 2 is a view taken on line 2—2 of Fig. 1.
Fig. 3 is a view taken on line 3—3 of Fig. 1.
Fig. 4 is a view taken on line 4—4 of Fig. 1.

The invention is preferably mounted over a container or receptacle 7 in which water may be deposited if desired. The invention comprises a frame having side walls 8 and 9, a forward platform 10, a rear wall 11, and a rearward platform 12. A tilting platform or trap slide 13 is provided with upwardly projecting flanges or side walls 14 and 15 and pivotally mounted on the rod or bolt 16 which is projected through the side walls 8 and 9 and spaced therefrom by spacers 17 and 18, respectively. It will be noted that the trap slide 13 is pivotally mounted intermediate its ends and mounted on the rearward or short end of the trap slide 13 is a counter-balancing weight 18 which renders the rearward side of the trap slide the heavier so that by gravity the trap slide is always moved into the position shown in full lines in Fig. 1. Secured to and projecting inwardly from the inner surface of the side wall 8 is a bracket 20 having a depending portion 21. An engagement plate 22 is pivotally mounted on the bracket 21 by means of the bolt 23 which extends through the spacer 24. The plate 22 is provided with the arcuate slot through which projects the guide bolt 26, this bolt also projecting through the spacer 27 and through the bracket portion 21. An opening 28 is formed in the plate 22 in which engages the eccentric head 29 of the screw 29'. A notch 30 is formed in the plate 22 to form the forwardly projecting engagement arm or tongue 31 which is adapted to engage the upwardly curved edge 35 of the bait support 32 which is pivotally mounted on the rod 33 which engages in notches 34 formed in the side walls 8 and 9. Mounted on the bracket 20 and projecting outwardly therefrom so as to project over the plate 22 and rest in engagement therewith is a leaf spring 36, a screw 37 serving to attach this leaf spring at its rearward end on the bracket 20. An adjusting screw 38 is projected through the leaf spring which normally is flexed upwardly from the bracket 20 as shown in Fig. 4 and the screw 38, by moving the leaf spring downwardly relatively to the bracket 20 serves to adjust the tension of the leaf spring 36 in its engagement with the plate 22.

In operation, when the trap is positioned over the receptacle 7, and bait 39 is mounted on the bait support 32, this bait serves to retain the support 32 in the position shown in full lines in Fig. 1. The edge of the plate 22 adjacent the notch 30 is in engagement with the upper surface of the trap slide 13 at the rear end thereof, thus resisting downward swinging movement of the trap slide. When an animal is resting on the trap slide and attempts to nibble on the bait 39, the support 32 will be swung rearwardly so as to rock the plate 22 against the tension of the spring 36 sufficient to disengage the plate 22 from the trap slide 13 and permit the trap slide 13 to rock into the position shown in dotted lines in Fig. 1 so as to deposit the animal in the receptacle 7. When the animal is removed from the trap slide 13, the block 19 will again move it into horizontal position and the plate 22 will move into locking position. The plate 22 when moving into locking position will bring the edge of the opening 28 into engagement with the eccentric head 29, this eccentric head, therefore, serving as an abutment to limit the rocking movement of the plate 22 in response to the pressure of the spring 36. The engagement of the screw or bolt 26 in the slot 25 serves as a guide for the plate 22 in its rocking movements. This method of locking the trap slide 13 in operative position and permitting its ready release is one which is quite sensitive and which permits of adjustment to various degrees so as to accommodate the trap to animals of different sizes. By adjusting the eccentric head 29, the amount of overlapping or engagement of the plate 22 with the rearward end of the trap slide 13 may be adjusted.

While I have illustrated and described the preferred form of my invention, I do not wish to limit myself to the precise details of structure shown but desire to avail myself of such variations and modifications as come within the scope of the appended claims.

Having thus described my invention, what I claim as new and desire to secure by Letters Patent is:

1. In a trap of the class described, a swingable trap slide; a pivotally mounted engagement member for engaging said trap slide and preventing swinging movement of the same in one direction; resilient means engaging said engagement member for resisting movement of the same to inoperative position; and means for adjusting the tension of said resilient means.

2. In a trap of the class described, a swingably mounted trap slide; a swingable engagement member for engaging said trap slide and preventing swingable movement thereof, said engagement member having an opening formed therein; and eccentric means engageable in and movable to various positions in said opening for determining the amount of engagement of said engagement member with said trap slide.

3. In a trap of the class described, a swingably mounted trap slide; a swingable engagement member for engaging said trap slide and preventing swingable movement thereof, said engagement member having an opening formed therein; eccentric means engageable in said opening for determining the amount of engagement of said engagement member with said trap slide; and adjustable resilient means for normally resisting movement of said engagement member to non-engaging position.

4. In a trap of the class described, a swingably mounted trap slide; a swingable engagement member for engaging said trap slide and preventing swingable movement thereof, said engagement member having an opening formed therein; eccentric means engageable in said opening for determining the amount of engagement of said engagement member with said trap slide; adjustable resilient means for normally resisting movement of said engagement member to non-engaging position; a swingable bait support; and a portion on said engagement member engageable with said bait support effective upon swinging of said bait support in one direction a predetermined distance for releasing said engagement member from engagement with said trap slide.

5. In a trap of the class described, a swingably mounted trap slide; a swingable engagement member for swinging in one direction for engaging said trap slide and preventing swingable movement thereof and upon swinging in the opposite direction a predetermined distance for disengaging said trap slide; and adjustable means for determining the amount of movement in said opposite direction necessary for effecting disengagement of said engagement member with said trap slide.

In testimony whereof I have signed the foregoing specification.

WILLIAM I. SIMMONS.